Feb. 29, 1944.   W. L. SAVELL   2,343,085
BLACK LIQUOR CONCENTRATION
Filed Oct. 30, 1940
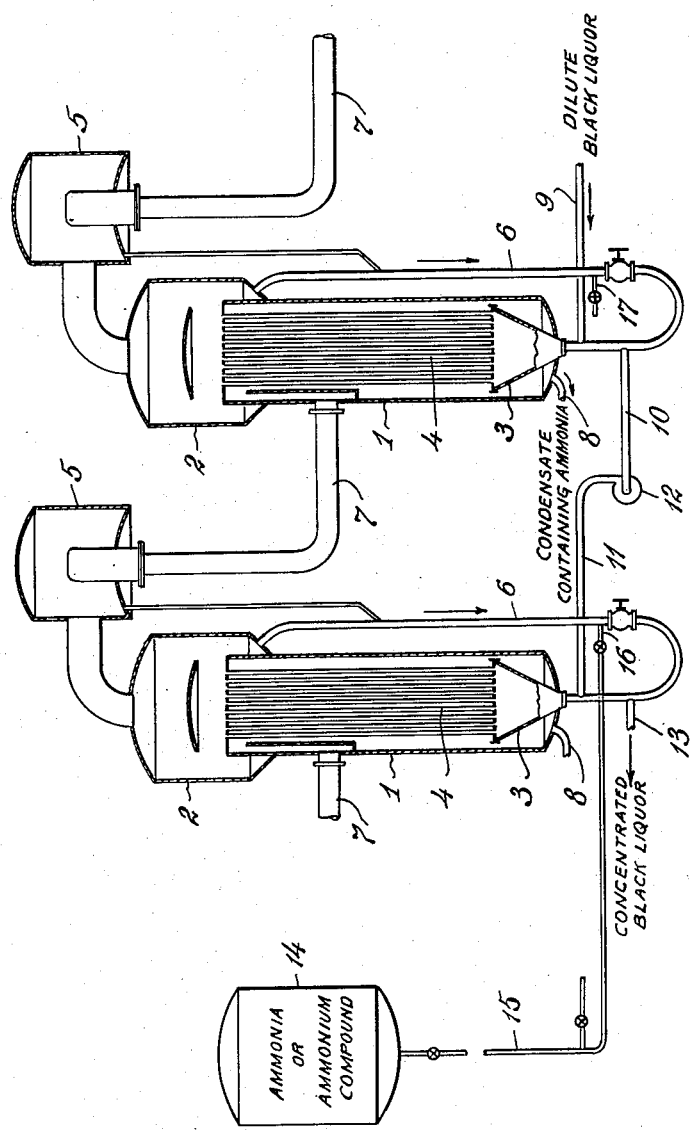
INVENTOR
WALTER L. SAVELL
BY
ATTORNEYS Patented Feb. 29, 1944

2,343,085

UNITED STATES PATENT OFFICE 2,343,085

BLACK LIQUOR CONCENTRATION

Walter Lee Savell, Forest Hills, N. Y., assignor to The Mathieson Alkali Works, Inc., New York, N. Y., a corporation of Virginia Application October 30, 1940, Serial No. 363,503

2 Claims. (Cl. 159—47)

In the regeneration of sodium hydroxide sodium sulphide cooking liquor for the production of wood pulp by the kraft or so-called "sulphate process," the spent liquor drained and washed from the pulp mass following the cooking operation is processed for the recovery of sodium hydroxide and sodium sulphide. As separated from the pulp the spent liquor is known as black liquor. This black liquor contains any unconsumed sodium hydroxide and sodium sulphide, compounds formed by reaction of these pulping agents with organic constituents of the wood and other organic material extracted from the wood during cooking. In the conventional recovery operation this black liquor is concentrated in multiple effect evaporators as one step in a dehydration operation to form a dehydrated residue known as black ash which is carbonized and burned to eliminate organic matter and to regenerate inorganic salts potentially present. This invention relates particularly to improvements in the multiple effect evaporation of black liquor and has as its primary object the reduction or elimination of corrosion in evaporators used for this purpose and the consequent improvement in economy of the recovery operation.

In such multiple effect evaporation of black liquor the water evaporated from the liquor in one stage is used to supply by indirect exchange the heat required for evaporation of water from the liquor under a lower pressure in another stage, the water vapor from the first stage being condensed in the second stage by this indirect heat exchange. Although the black liquor itself is alkaline, I have found by repeated tests that the vapors liberated from the liquor in the several stages condense to form an aqueous liquid containing hydrogen sulphide are definitely acid. This condensate from one stage flows over the heating surfaces of the next stage in multiple effect evaporation and it is in this region particularly that severe corrosion occurs. This corrosion I have been able to reduce or eliminate by my present invention.

In carrying out my invention I introduce ammonia into the black liquor to be concentrated, vaporize this ammonia from the liquor in one stage, or effect, of the multiple effect evaporator and pass the resulting ammonia vapors with the evaporated water to another stage or effect to serve as the heating medium therein. The ammonia present dissolves in the water formed by condensation in the second stage or effect and thus by regulating the rate at which ammonia is liberated in the first stage or effect I am enabled to maintain a hydrogen ion concentration in the condensate formed in the second stage or effect appropriate with reference to the particular material of which the particular evaporator is constructed to limit or prevent corrosion. The ammonia may be introduced into the black liquor to be concentrated as anhydrous ammonia or as aqueous ammonia or it may be introduced in the form of an ammonium compound liberating ammonia in the presence of the alkaline constituents of the black liquor at the temperatures prevailing in the evaporator. Introduction of the ammonia in the form of ammonium sulphate is particularly advantageous. Such ammonium sulphate is decomposed by the alkaline black liquor to liberate ammonia which is vaporized at the temperatures prevailing in the evaporator and to form sodium sulphate with sodium hydroxide present thus to increase the proportion of sodium sulphide formed when the black liquor is carbonized and burned. The ammonia or ammonium compound may be introduced into the black liquor to be concentrated before or as it enters the multiple effect evaporator or it may be introduced into the black liquor entering the first stage or into the black liquor as it passes to each of several stages of the evaporator. Ammonium sulphate may be added in dry form or as an aqueous solution. The dry material is conveniently added to the black liquor before or as it enters the evaporator. The rate of ammonia liberation in the evaporator, or in the several stages of the evaporator, is controlled by regulating the proportion of ammonia or ammonium compound introduced into the black liquor entering the evaporator, or entering each of several stages of the evaporator. In an evaporator using mild steel tubes for example the introduction of the ammonia or ammonium compound may be regulated to maintain a pH somewhat exceeding 7 to protect the metal tubes.

The figure of the drawing represents a diagrammatic illustration of one form of evaporator.

This drawing illustrates, diagrammatically and conventionally, in elevation and partly in section, two stages of a conventional multiple effect evaporator together with supply connections for introducing ammonia or an ammonium compound.

Each of the two stages of the multiple effect evaporator illustrated in the drawing comprises a shell 1, a vapor box 2 over the upper end of the shell, a liquor box 3 within the lower end of the shell and a bundle of tubes 4 connecting the liquor box and the vapor box through tube sheets extending across the upper end of the liquor box and the upper end of the shell. Within each stage liquor separating in the vapor box 2, together with liquor separating in the entrainment collector 5, recirculates through connection 6 to the liquor box 3. The heating medium, steam from extraneous source in the first stage and water vapor from the preceding stage in successive stages, enters the space in the shell 1 around the tubes 4 through connection 7 condensing in this space to give up heat to the liquor circulating through the tubes. The condensate thus produced is discharged from the lower end of the shell through connection 8. The dilute black liquor is supplied through connection 9 to the stage operated at lower pressure, the black liquor concentrated in this stage is transferred to the next through connections 10 and 11 by means of pump 12 and the black liquor concentrated in the next stage is withdrawn through connection 13. To the extent described in this paragraph, the arrangement and operation of the multiple effect evaporator in concentrating black liquor is conventional.

In carrying out my invention in apparatus such as that illustrated, however, I introduce ammonia or an appropriate ammonium compound into the liquor entering one or more of the several evaporating stages. The ammonia so introduced is vaporized as the liquor flows through the heated tubes 4 and is thus liberated with the evaporated water separating in the vapor box 2 and passing to a succeeding stage through connection 7 as a heating medium. When the water vapor condenses upon giving up its heat in the succeeding stage, the ammonia thus present dissolves in the condensate to maintain a hydrogen ion concentration limiting or preventing corrosion of the tubes. In the particular form of apparatus illustrated in the drawing the ammonia or ammonium compound is supplied from tank 14 through connection 15 and connection 16 or 17 to one or more of the circulating connections 6. The rate of introduction of the ammonia or ammonium compound is regulated by the several valves illustrated in these connections. As previously indicated the ammonia may be supplied as anhydrous liquid ammonia or as aqueous ammonia or, in the particular form of apparatus illustrated, as an aqueous solution of an ammonium compound such as ammonium sulphate.

Corrosion of the heating surfaces of multiple effect evaporators used for the concentration of black liquor, these heating surfaces usually being in the form of tubes, involves an important element of expense in the maintenance of such evaporators and consequently my invention in reducing or eliminating such corrosion affords important economies. The introduction of the ammonia or ammonium compound into the system in the manner provided by my invention is simple, effective and easily controlled. The practice of my invention does not involve the introduction of any material forming an extraneous residue to remain in the concentrated black liquor moving through the recovery operations. Also the practice of my invention does not involve any new technical problems in the operation of the multiple effect evaporator.

I claim:

1. In the concentration of black liquor in multiple effect evaporators, the improvement which comprises introducing ammonia into the liquor to be concentrated, vaporizing ammonia from the liquor in one effect of the evaporator and passing the ammonia vapors with the evaporated water to another effect.

2. In the concentration of black liquor in multiple effect evaporators, the improvement which comprises introducing ammonia in the form of ammonium sulphate into the liquor to be concentrated, vaporizing ammonia from the liquor in one effect of the evaporator and passing the ammonia vapors with the evaporated water to another effect.

WALTER LEE SAVELL.